United States Patent
Nakamura et al.

(10) Patent No.: US 7,976,982 B2
(45) Date of Patent: Jul. 12, 2011

(54) ALKALINE STORAGE BATTERY

(75) Inventors: Yasushi Nakamura, Kanagawa (JP);
Yoshitaka Dansui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/794,865

(22) PCT Filed: Dec. 28, 2005

(86) PCT No.: PCT/JP2005/024051
§ 371 (c)(1),
(2), (4) Date: Jul. 16, 2008

(87) PCT Pub. No.: WO2006/080174
PCT Pub. Date: Aug. 3, 2006

(65) Prior Publication Data
US 2008/0286650 A1 Nov. 20, 2008

(30) Foreign Application Priority Data

Jan. 6, 2005 (JP) ................. 2005-001205

(51) Int. Cl.
*H01M 4/02* (2006.01)
*H01M 4/72* (2006.01)
*H01M 6/04* (2006.01)

(52) U.S. Cl. .......... 429/223; 429/206; 429/233
(58) Field of Classification Search .......... 429/206, 429/233, 241, 242, 223
See application file for complete search history.

(56) References Cited

U.S. PATENT DOCUMENTS

| 6,455,196 B1 * | 9/2002 | Kato et al. | 429/223 |
| 6,682,848 B1 * | 1/2004 | Yano et al. | 429/206 |

FOREIGN PATENT DOCUMENTS

| JP | 59-096659 | 6/1984 |
| JP | 07272722 A * | 10/1995 |
| JP | 2581362 | 11/1996 |
| JP | 2947284 | 7/1999 |
| JP | 11-219702 | 8/1999 |
| JP | 11-242958 | 9/1999 |
| JP | 2001-102084 | 4/2001 |
| JP | 3275594 | 2/2002 |

OTHER PUBLICATIONS

Machine translation of JP 07272722, Kobayashi et al., Oct. 1995.*
MSDS for Cobalt Oxide, retrieved on Mar. 24, 2010 from: http://msds.chem.ox.ac.uk/CO/cobalt_oxide.html.*
MSDS for HPMC, retrieved on Mar. 24, 2010 from: http://www.chemicalbook.com/ProductMSDSDetailCB3225318_EN.htm.*
MSDS for Cobalt metal, Cerac Inc., Milwaukee, WI. Retrieved on Mar. 24, 2010 from: http://asp.cerac.com/CatalogNet/default.aspx?p=msdsFile&msds=m000190.htm.*
MSDS for Nickel Hydroxide, retrieved on Mar. 24, 2010 from: http://fscimage.fishersci.com/msds/53189.htm.*
"PTFE Specifications", Boedecker.com, 904 West 6$^{th}$ Street, Shiner, TX 77984. Retrieved online on Jan. 3, 2011 from: http://www.boedeker.com/ptfe_p.htm.*
"Acetylene Black MSDS", JACAAB L.L.C., 4155 Manchester Avenue, St. Louis, MO 63110. Retrieved online on Jan. 3, 2011 from: http://www.jacaab.com/msds/msds%20Black.pdf.*
"Preparation of alkaline PVA-based polymer electrolytes for Ni-MH and Zn-air batteries", Yang et al., Journal of Applied Electrochemistry, 33: 777-784, 2003.*
"Handbook of Filter Media 2$^{nd}$ Edition", Purchas et al., Elsevier Science Ltd., 2002.*

* cited by examiner

*Primary Examiner* — Jonathan Crepeau
*Assistant Examiner* — Kenneth Douyette
(74) *Attorney, Agent, or Firm* — McDermott Will & Emery LLP

(57) ABSTRACT

An alkaline storage battery includes, as main constituent elements, a positive electrode having nickel hydroxide as an active material, a negative electrode, a separator, and an electrolyte made of an aqueous alkali solution, and a foamed three-dimensional porous substrate composed of nickel as a main component is used as a core substrate of the positive electrode, and the weight ratio of this core substrate in the positive electrode is set to 30% to 50%, thereby allowing both electron conductivity and ion conductivity of the positive electrode, with long life and high output even under severe conditions.

3 Claims, No Drawings

ALKALINE STORAGE BATTERY

RELATED APPLICATIONS

This application is the U.S. National Phase under 35 U.S.C. §371 of International Application No. PCT/JP2005/024051, filed on Dec. 28, 2005, which in turn claims the benefit of Japanese Application No. 2005-001205, filed on Jan. 6, 2005, the disclosures of which Applications are incorporated by reference herein.

TECHNICAL FIELD

The present invention relates to an alkaline storage battery, and particularly to an improvement to the weight ratio of a core substrate in a positive electrode.

BACKGROUND ART

Alkaline storage batteries are less susceptible to environment and charging/discharging conditions, and have thus been recently receiving attention as power sources for hybrid electric vehicles (hereinafter, abbreviated as HEV) while yielding demand to lithium ion secondary batteries as power sources for portable devices.

HEV power sources are more often discharged in a pulsed mode rather than in a continuous mode, unlike power sources for portable devices. Therefore, the system efficiency has been improved by enhancing the output characteristic per cell, rather than by simply increasing the number of cells to be connected in series. In view of this, attempts have been made to lower the direct-current resistances in the HEV power sources in particular by reducing the resistances of the components, improving the reactivity of the active materials, and the like. One of the examples is an improvement to the structure of the positive electrode.

Positive electrodes for alkaline storage batteries are broadly classified into a sintered type and a non-sintered type. A sintered type positive electrode is formed by impregnating a porous nickel sintered substrate having a porosity of 80% or so, which is obtained by sintering nickel powder, with a nickel salt solution such as an aqueous nickel nitrate solution, and then immersing it into an aqueous alkali solution to precipitate nickel hydroxide active material (for example, Patent Document 1). This sintered substrate contains dense nickel skeletons having a pore size of 10 μm or so, and thus has a high collecting capability. Since the fine nickel skeletons have large surface areas, there is the disadvantage that repetition of charging and discharging oxidizes the nickel skeletons to consume an electrolyte, thereby increasing the direct-current resistance of the battery. Then, there has been proposed a process of applying an antioxidant surface treatment to nickel surfaces so that the nickel skeletons become less prone to oxidation (for example, Patent Document 2).

Meanwhile, a non-sintered type positive electrode uses a foamed three-dimensional porous substrate of nickel metal having a porosity of around 95% as a core substrate, which is filled with nickel hydroxide powder as an active material (for example, Patent Document 3). This core substrate has a porosity higher than those of the sintered type positive electrodes, and thus is capable of increased capacity. The weight ratio of the core substrate in this positive electrode is typically as low as around 15% to 25%, in comparison to 45% to 60% in sintered type positive electrodes, and the content of the active material is accordingly higher. Non-sintered type positive electrodes have thick skeletons of nickel and relatively flat skeleton surfaces, with significantly smaller surface areas as compared to sintered type positive electrodes. The nickel skeletons are thus harder to oxidize and can avoid oxidation which entails the consumption of the electrolyte.

Attempts have been made to achieve a high-output alkaline storage battery for HEV, free of nickel skeleton oxidation, by comprising an non-sintered type positive electrode with a core substrate weight ratio equivalent to that of a sintered type positive electrode, through the use of the technique according to the foregoing Patent Document 2, or through the use of the foamed three-dimensional porous substrate according to Patent Document 3.

Patent Document 1: Publication of Japanese Patent No. 3275594
Patent Document 2: Japanese Patent Laid-Open Publication No. Sho 59-96659
Patent Document 3: Japanese Patent Laid-Open Publication No. Hei 11-242958

DISCLOSURE OF THE INVENTION

Problems to be Solved by the Invention

Nevertheless, it has been difficult even by using the technique of Patent Document 2 to obtain satisfactory characteristics on the life tests conducted on the assumption of high-temperature long-term use. Furthermore, when the foamed three-dimensional porous substrate of Patent Document 3 was used to comprise non-sintered type positive electrodes with core substrate weight ratios equivalent to those of sintered type positive electrodes, the direct-current resistances were, contrary to expectations, significantly higher than when the sintered type positive electrodes are used. In order to provide desired output values, additional cells therefore had to be connected in series.

The present invention has been achieved in order to solve the foregoing problem, and provides a high-output alkaline storage battery, which has long life even under severe conditions.

Means for Solving the Problems

To solve the foregoing problem, an alkaline storage battery according to the present invention includes, as main constituent elements, a positive electrode having nickel hydroxide as an active material, a negative electrode, a separator, and an electrolyte made of an aqueous alkali solution. In this alkaline storage battery, a foamed three-dimensional porous substrate composed of nickel as a main component is used as a core substrate of the positive electrode, and the weight ratio of this core substrate in the positive electrode (hereinafter, abbreviated as core substrate weight ratio) is 30% to 50%.

According to such a configuration, it is possible to achieve a high-performance alkaline storage battery which has both long life and high output even under severe conditions, because of the use of the positive electrode having a core substrate weight ratio at which ion conductivity and electron conductivity of the non-sintered type positive electrode are well balanced.

BEST MODE FOR CARRYING OUT THE INVENTION

Hereinafter, a best mode for carrying out the present invention will be described.

A positive electrode, the gist of the present invention, is of non-sintered type and its core substrate must be a foamed three-dimensional porous substrate. When batteries are used at constant temperatures, even a sintered type positive electrode can provide a sufficient life characteristic. If used at high temperatures for a long period of time, however, the fine nickel skeletons obtained by sintering are undesirably oxidized to consume the electrolyte. Besides, the non-sintered type positive electrode must have a core substrate weight ratio of 30% to 50%. Since the foamed three-dimensional porous substrate has a skeleton thickness greater than that of sintered type positive electrodes, and is formed to cover nickel hydroxide as a positive electrode active material, the core substrate weight ratio in the positive electrode is different from the conventional design range (45% to 60%) of sintered type positive electrodes. Specifically, core substrate weight ratios of below 30% cannot provide sufficient electron conduction. Above 50%, the degree of exposure of the positive electrode active material becomes too low to provide sufficient ion conduction. In either case, the output characteristics will deteriorate. In this instance, the core substrate weight ratio can be adjusted by modifying the amount of the active material per unit volume of the foamed three-dimensional porous substrate.

Moreover, the number of pores of the foamed three-dimensional porous substrate in a section perpendicular to the plane of the electrode plate (hereinafter, simply abbreviated as "the number of pores") is preferably 130 to 180 pores/inch. While the number of pores of a foamed three-dimensional porous substrate is typically counted in the plane of the electrode plate, it is counted in the section perpendicular to the plane of the electrode plate according to the present invention. The reason for this is that ion enters and exits the electrode plate through the surface by the medium of the electrolyte, and based on which the inventors have found that: the number of pores counted in the plane merely defines "gateways" of ion, while what the present invention is concerned with is the ion conductivity inside the electrode plate and it is closely related to the number of pores that defines "in-plate paths" of ion to be counted in a section perpendicular to the plane of the electrode plate. In this instance, the number of pores is set to or above 130 pores/inch so that the skeletons of the foamed three-dimensional porous substrate increase in number, and ion can be conducted through the gaps for high ion conductivity. The number of pores is also set to or below 180 pores/inch so that the skeletons of the foamed three-dimensional porous substrate can be prevented from being broken by rolling or the like on fabricating the positive electrode, thereby allowing high electron conductivity. This number of pores $PPI_{2D}$ can be calculated by embedding part of the fabricated positive electrode into an epoxy resin, polishing the same, determining the number $\chi$ of triangular points in the skeleton sections of the porous substrate from a magnified sectional picture of power G (photographed area of S cm$^2$), and then using the following equation 1. This value can also be changed by modifying the amount, diameter, and directions of urethane fibers in use when fabricating the foamed three-dimensional porous substrate, as well as the amount of plating on the urethane and the like. It follows that this value does not necessarily correlate with the number of pores typically counted in the plane of the electrode plate:

$$PPI_{2D}=(-132+3.3744\chi G^2/S+6.6\times10^{-5}(\chi G^2/S)^2)^{1/2} \quad \text{(Eq. 1)}$$

In this instance, conductive agents such as cobalt, cobalt hydroxide and cobalt oxide, binders such as polytetrafluoroethylene (hereinafter, abbreviated as PTFE), and thickeners such as carboxymethylcellulose (hereinafter, abbreviated as CMC) may be added to the positive electrode, if necessary.

When the foregoing positive electrode is used to make a nickel-cadmium storage battery, the negative electrode may use cadmium as its active material. Moreover, if the foregoing positive electrode is used to make a nickel metal hydride battery, the negative electrode may use a hydrogen-absorption alloy as its active material. When a hydrogen-absorption alloy is used as the negative electrode active material, conductive agents such as carbon black and thickeners such as styrene-butadiene copolymer (hereinafter, abbreviated as SBR) and CMC may be added as sub ingredients, if necessary. In addition, a two-dimensional porous substrate such as punched metal may be used as the core substrate, aside from the foamed three-dimensional porous substrate mentioned above.

For a separator, non-woven fabric composed chiefly of olefin resins such as polypropylene may be used.

For the electrolyte, an electrolyte made of an aqueous alkali solution containing an appropriate combination of potassium hydroxide, sodium hydroxide and lithium hydroxide may be used. In this instance, a hydroxide ion concentration of 6.0 to 8.0 mol/l is preferable from the viewpoint of improved ion conductivity. In the positive electrode of the present invention, the core skeletons cover the positive electrode active material to a higher extent than in sintered type positive electrodes, which have been used for conventional high-output alkaline storage batteries. In order to secure sufficient ion conductivity, it is therefore preferable that the hydroxide ion concentration falls within the range of 6.0 to 8.0 mol/l with an appropriate adjustment in viscosity. In this instance, a hydroxide ion concentration of 6.0 mol/l or higher can provide ion concentration sufficient for the reaction. Moreover, a hydroxide ion concentration of 8.0 mol/l or lower can maintain low viscosity so as not to hinder ion migration.

Hereinafter, embodiments of the present invention will be described in detail.

EMBODIMENT 1

An aqueous sodium hydroxide solution was gradually dropped into an aqueous solution containing nickel sulfate as a main component with a predetermined content of cobalt sulfate and zinc sulfate, while adjusting the solution pH with ammonia water. The resulting precipitate was rinsed in water and dried to obtain nickel hydroxide powder of spherical shape serving as a positive electrode active material.

In the meantime, an aqueous cobalt sulfate solution was gradually added to an aqueous sodium hydroxide solution while adjusting the solution pH with ammonia water. The resulting precipitate was rinsed in water and dried to obtain cobalt hydroxide powder serving as a conductive agent.

With respect to 100 parts by weight of the foregoing nickel hydroxide, 10 parts by weight of cobalt hydroxide, 0.1 parts by weight of CMC, 0.5 parts by weight of PTFE, and an appropriate amount of pure water were mixed in and dispersed to make a paste. This paste was filled into five types of foamed nickel three-dimensional porous substrates having different weight densities, and then dried and rolled under a roller press. These were cut and lead parts were attached thereto to fabricate positive electrodes. These positive electrodes will be referred to as A1 (24% in core substrate weight ratio, 156 pores/inch in the number of pores), A2 (32% in core substrate weight ratio, 159 pores/inch in the number of pores), A3 (41% in core substrate weight ratio, 155 pores/inch in the number of pores), A4 (49% in core substrate weight ratio, 157 pores/inch in the number of pores), and A5 (58% in core substrate weight ratio, 155 pores/inch in the number of pores).

For the sake of comparison, a sintered type nickel positive electrode was fabricated by the following method. Initially, a sintered body of nickel powder was formed and prepared on both sides of a core substrate, which was made of a nickel-plated punched iron sheet. This was sintered in a reducing atmosphere to obtain a porous sintered nickel substrate. Next, this substrate was heated in a 400° C. air atmosphere in an electric furnace for three minutes, thereby forming a nickel oxide layer on the surfaces of the substrate. This was immersed into the foregoing aqueous nitric acid solution for 15 minutes so that the pores of the substrate were impregnated with nickel nitrate, and then dried in a 100° C. atmosphere. The substrate, containing nickel nitrate, was subsequently immersed into an aqueous sodium hydroxide solution so that nickel nitrate turned into nickel hydroxide, and this substrate was rinsed in water and dried. This operation was repeated six times to obtain a sintered type nickel positive electrode. Part of the resulting positive electrode was treated with an acetic acid solution to remove the active material, and this electrode was measured and found to have a core substrate weight ratio of 51%. This positive electrode will be referred to as A6.

The positive electrodes A1 to A6 fabricated, negative electrodes primarily composed of a hydrogen-absorption alloy, and separators made of hydrophilically-treated polypropylene non-woven fabric were wound while the separators are arranged so that the positive electrode plates and the negative electrodes were insulated, thereby fabricating electrode assemblies. The resulting electrode assemblies were put into battery cases, and then an aqueous alkali electrolyte containing solutes of potassium hydroxide, sodium hydroxide and lithium hydroxide with a total hydroxide ion concentration of 7 mol/l was poured in, and sealed to fabricate batteries having a diameter of 34 mm, a length of 59.3 mm, and a nominal capacity of 6000 mAh (so-called D size). These batteries will be referred to as A1 to A6.

Each of the foregoing batteries was subjected to a cycle of charging with 600 mA for 15 hours and discharging with 6000 mA for 40 minutes twice, and then stored at 45° C. for three days for negative electrode activation. Furthermore, a cycle of discharging with 6000 mA down to 1.0 V and charging with 6000 mA for 66 minutes was repeated ten times for negative electrode activation. Subsequently, the following evaluations were made.

(Direct-Current Resistance)

Each battery was discharged with 6000 mA down to 1.0 V and then charged with 600 mA for five hours. Each of these batteries was stored for 30 minutes, and then subjected to the following charging and discharging cycles at 20° C.:

First cycle: discharge with 6000 mA×20 seconds, rest for 5 minutes, charge with 6000 mA×20 seconds, and rest for 5 minutes;

Second cycle: discharge with 18000 mA×20 seconds, rest for 5 minutes, charge with 18000 mA×20 seconds, and rest for 5 minutes;

Third cycle: discharge with 36000 mA×20 seconds, rest for 5 minutes, charge with 36000 mA×20 seconds, and rest for 5 minutes; and Fourth cycle: discharge with 60000 mA×20 seconds, rest for 5 minutes, charge with 60000 mA×20 seconds, and rest for 5 minutes.

From the current settings in these four discharges and voltages after 10 seconds, an approximate line was determined by using the least-squares method, and the gradient was obtained as the direct-current resistance to be a substitute value for the output characteristic. Table 1 shows the results.

(Life Characteristic)

Each battery was subjected to a cycle of discharging with 6000 mA down to 1.0 V and charging with 6000 mA for 48 minutes at 20° C. repeatedly, and measured for the foregoing direct-current resistance at every 10 cycles. Considering the point in time where the direct-current resistance reached double the initial value as life, the ratio of the number of cycles up to life expiration was determined with respect to that of A6 having the sintered type positive electrode. Table 2 shows the results.

TABLE 1

| | Type of Positive Electrode | Core substrate Weight Ratio (%) | Direct-Current Resistance (mΩ) |
|---|---|---|---|
| A1 | Non-sintered Type | 24 | 3.2 |
| A2 | | 32 | 2.8 |
| A3 | | 41 | 2.5 |
| A4 | | 49 | 2.7 |
| A5 | | 58 | 3.3 |
| A6 | Sintered Type | 51 | 2.8 |

TABLE 2

| | Type of Positive Electrode | Core substrate Weight Ratio (%) | Life (relative value) |
|---|---|---|---|
| A1 | Non-sintered Type | 24 | 2.0 |
| A2 | | 32 | 2.1 |
| A3 | | 41 | 2.1 |
| A4 | | 49 | 2.2 |
| A5 | | 58 | 2.2 |
| A6 | Sintered Type | 51 | 1.0 |

As can be seen from Table 1, at core substrate weight ratios of 30% to 50%, the direct-current resistance was reduced to or below that of the battery having the sintered type positive electrode of the conventional example. The battery A1 having a core substrate weight ratio of below 30% had a higher direct-current resistance since its core substrate, serving as the source of electron conductivity, was small in amount. On the other hand, the battery A5 having a core substrate weight ratio of above 50% also resulted in an increased direct-current resistance. One conceivable reason for this is that the excessive presence of the foamed three-dimensional porous substrate covered up the active material and hindered ion conduction, thereby failing to provide sufficient ion conduction.

Moreover, as can be seen from Table 2, any of those having the non-sintered type positive electrodes shows a life characteristic superior to that of the conventional example which uses the sintered type positive electrode. One conceivable reason for this is that the nickel skeletons of the sintered type positive electrode are oxidized to consume the electrolyte and thus increases in resistance in the process of repeating charging and discharging, whereas the nickel skeletons in the cases of using the non-sintered type positive electrodes are less prone to oxidation and the electrolyte is less likely to be consumed.

As above, when a foamed three-dimensional porous substrate is used as the core substrate of the positive electrode at a core substrate weight ratio of 30% to 50%, it is possible to fabricate an alkaline storage battery of high output with an excellent life characteristic.

EMBODIMENT 2

Based on the positive electrode A3 of embodiment 1, positive electrode plates and batteries were fabricated as in embodiment 1 except that the type of urethane to be used when making the foamed three-dimensional porous substrate was changed to modify the number of pores of the foamed three-dimensional porous substrate in the cross section of the electrode plate. These will be referred to as B1 (39% in core substrate weight ratio, 121 pores/inch in the number of pores), B2 (40% in core substrate weight ratio, 132 pores/inch in the number of pores), B3 (41% in core substrate weight ratio, 155 pores/inch in the number of pores), B4 (40% in core substrate weight ratio, 177 pores/inch in the number of pores), and B5 (39% in core substrate weight ratio, 198 pores/inch in the number of pores).

The batteries fabricated were subjected to negative electrode activation under the same conditions as in embodiment 1, and then evaluated for direct-current resistance and life characteristic similarly under the same conditions as in embodiment 1. Table 3 shows the results on the direct-current resistance, and Table 4 shows the results on the life characteristic.

TABLE 3

|  | Number of Pores (pores/inch) | Direct-Current Resistance (mΩ) |
|---|---|---|
| B1 | 121 | 2.9 |
| B2 | 132 | 2.6 |
| B3 | 155 | 2.5 |
| B4 | 177 | 2.7 |
| B5 | 198 | 2.9 |

TABLE 4

|  | Number of Pores (pores/inch) | Life (relative value) |
|---|---|---|
| B1 | 121 | 2.1 |
| B2 | 132 | 2.2 |
| B3 | 155 | 2.1 |
| B4 | 177 | 2.0 |
| B5 | 198 | 2.2 |

As can be seen from Table 3, the direct-current resistances are generally low in value, and particularly low when the number of pores is 130 to 180 pores/inch. In this instance, it is considered that B1 having the number of pores of below 130 pores/inch slightly dropped in ion conductivity since the foamed three-dimensional porous substrate had fewer skeletons (fewer gaps). It is also considered that B6 having the number of pores of above 180 pores/inch slightly dropped in electron conductivity since the skeletons of the foamed three-dimensional porous substrate were large in number (the skeletons were thin) and therefore the foamed three-dimensional porous substrate was easier to cause a skeleton break by rolling or the like on fabricating the positive electrode.

Moreover, as can be seen from Table 4, any of the batteries shows an excellent life characteristic. One conceivable reason for this is that the use of the non-sintered type positive electrodes makes the nickel skeletons less prone to oxidation so that the electrolyte is less likely to be consumed.

As above, when the number of pores of the foamed three-dimensional porous substrate in the cross section of the electrode plate is set to 130 to 180 pores/inch, it is possible to provide an alkaline storage battery of extremely high output with an excellent life characteristic.

EMBODIMENT 3

Based on the positive electrode A3 of embodiment 1, batteries were fabricated as in embodiment 1 except that the electrolyte was modified in hydroxide ion concentration. These will be referred to as C1 (5.5 mol/l in hydroxide ion concentration), C2 (6.0 mol/l in hydroxide ion concentration), C3 (7.0 mol/l in hydroxide ion concentration), C4 (7.5 mol/l in hydroxide ion concentration), C5 (8.0 mol/l in hydroxide ion concentration), and C6 (8.5 mol/l in hydroxide ion concentration).

The batteries fabricated were subjected to negative electrode activation under the same conditions as in embodiment 1, and then evaluated for direct-current resistance and life characteristic similarly under the same conditions as in embodiment 1. Table 5 shows the results on the direct-current resistance, and Table 6 shows the results on the life characteristic.

TABLE 5

|  | Hydroxide ion Concentration (mol/l) | Direct-Current Resistance (mΩ) |
|---|---|---|
| C1 | 5.5 | 2.9 |
| C2 | 6.0 | 2.6 |
| C3 | 7.0 | 2.5 |
| C4 | 7.5 | 2.6 |
| C5 | 8.0 | 2.7 |
| C6 | 8.5 | 2.9 |

TABLE 6

|  | Hydroxide ion Concentration (mol/l) | Life (relative value) |
|---|---|---|
| C1 | 5.5 | 2.2 |
| C2 | 6.0 | 2.1 |
| C3 | 7.0 | 2.1 |
| C4 | 7.5 | 2.1 |
| C5 | 8.0 | 2.0 |
| C6 | 8.5 | 2.0 |

As can be seen from Table 5, the direct-current resistances are generally low in value, and particularly low when the hydroxide ion concentration is 6.0 to 8.0 mol/l. In this instance, it is considered that C1 having a hydroxide ion concentration of below 6.0 mol/l slightly dropped in reactivity due to the insufficient ion concentration. It is also considered that C6 having a hydroxide ion concentration of above 8.0 mol/l slightly dropped in reactivity since the high viscosity of the electrolyte hindered sufficient permeation of the electrolyte into the electrode plate.

Moreover, as can be seen from Table 6, any of the batteries shows an excellent life characteristic. One conceivable reason for this is that the use of the non-sintered type positive electrodes makes the nickel skeletons less prone to oxidation so that the electrolyte is less likely to be consumed.

As above, when the hydroxide ion concentration is set within the range of 6.0 to 8.0 mol/l, it is possible to provide an alkaline storage battery of extremely high output with an excellent life characteristic.

INDUSTRIAL APPLICABILITY

As has been described, according to the present invention, the weight ratio of the core substrate in the positive electrode is set so that it is possible to secure ion conductivity and secure electron conductivity as well. This makes it possible to achieve an alkaline storage battery that can provide a favorable life characteristic and high output characteristic.

The invention claimed is:
1. An alkaline storage battery comprising, as main constituent elements, a positive electrode having nickel hydrox- ide as an active material, a negative electrode, a separator, and an electrolyte made of an aqueous alkali solution, wherein the positive electrode has, as a core substrate thereof, a foamed three-dimensional porous substrate composed of nickel as a main component, and a weight ratio of the foamed three-dimensional porous substrate in the positive electrode is 30% to 50% with respect to the positive electrode.

2. The alkaline storage battery according to claim 1, wherein the number of pores of the foamed three-dimensional porous substrate in a section perpendicular to a plane of an electrode plate is 130 to 180 pores/inch.

3. The alkaline storage battery according to claim 1, wherein the electrolyte has a hydroxide ion concentration of 6.0 to 8.0 mol/l.

* * * * *